July 9, 1940.  W. C. ROBINSON  2,207,301
UNDERFLOOR DUCT
Filed May 15, 1937  2 Sheets-Sheet 1
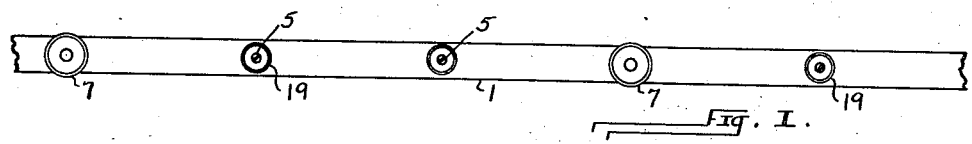
Fig. I.
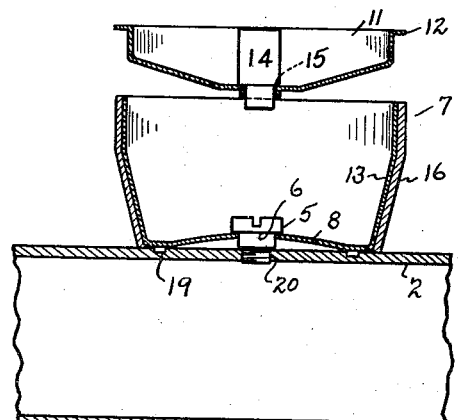
Fig. II.
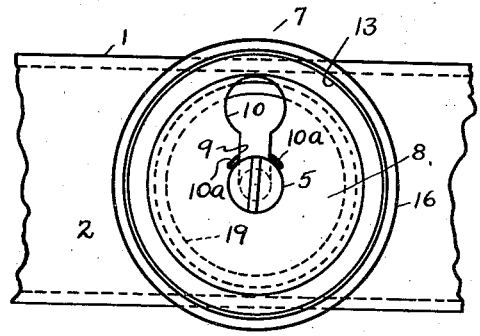
Fig. III.
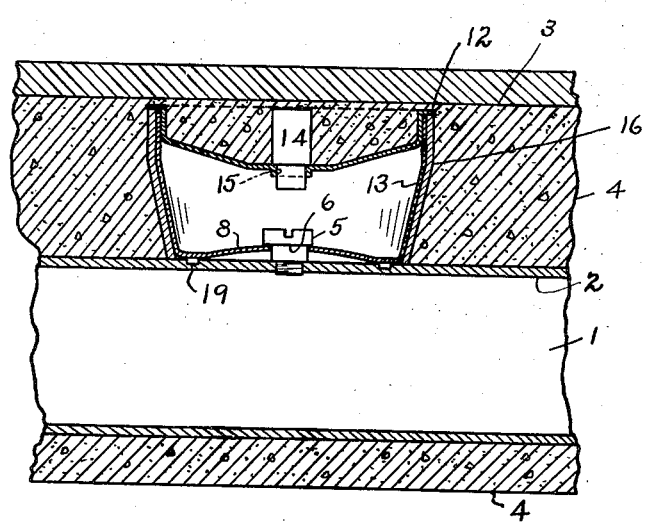
Fig. IV.
INVENTOR
William C. Robinson
BY
Christy and Wharton
ATTORNEYS July 9, 1940.   W. C. ROBINSON   2,207,301
UNDERFLOOR DUCT
Filed May 15, 1937   2 Sheets-Sheet 2
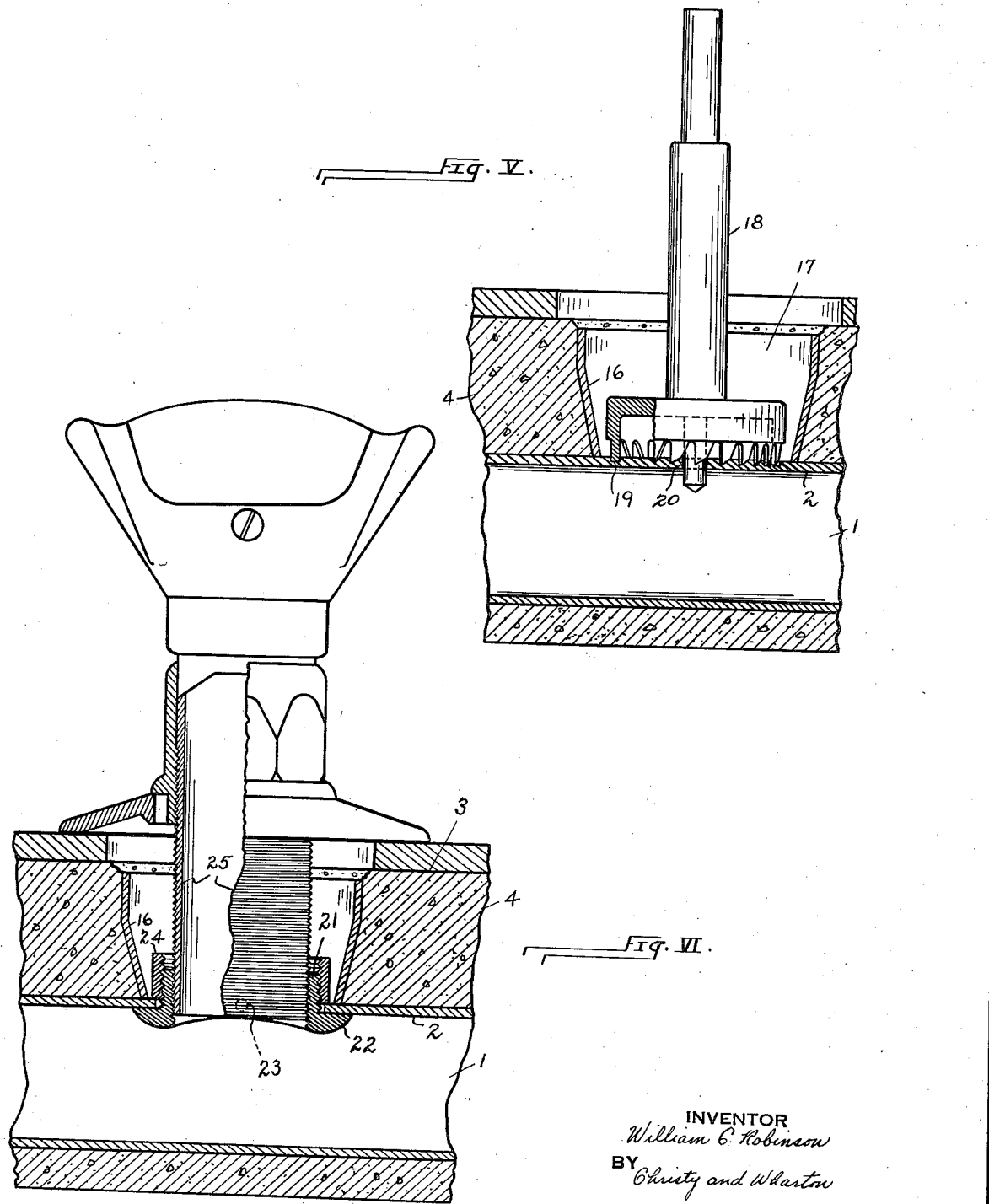
INVENTOR
William C. Robinson
BY Christy and Wharton
ATTORNEYS ns to installae spacing is therefore
UNITED STATES PATENT OFFICE 2,207,301

UNDERFLOOR DUCT

William C. Robinson, Sewickley, Pa., assignor to National Electric Products Corporation, a corporation of Delaware Application May 15, 1937, Serial No. 142,766

1 Claim. (Cl. 72—16)

This invention relates to underfloor duct for the housing of electrical wiring.

In many ways underfloor duct is ideal for the housing of electrical wiring systems in buildings having floors so made that the duct may satisfactorily be installed below the floor surface. One-piece metallic underfloor duct provides a completely and definitely grounded path for currents in manner to eliminate fire hazard throughout the extent of the underfloor duct system. Also, underfloor duct systems, since they may be wholly embedded below the surface of a concrete floor, are unobjectionable from the viewpoint of appearance, and being so embedded they are not subject to deterioration as are ducts installed in more exposed positions.

A problem inherent in the use of underfloor ducts is the provision of such access to the ducts that wiring systems may be installed in them, and more particularly the provision of access to the duct for the making of outlet connection to the conductors housed therein. For this reason it is usual practice to mount upon the one-piece metallic conduits, which provide underfloor duct of the most desirable type, members which reserve in the body of a concrete or similar floor structure consolidated about the duct spaces by which access may be had to a wall of the conduits which contain the wiring. Such members I shall herein, therefore, term generically "access elements."

Considering the probable utility of an underfloor duct system of this nature from the viewpoint of establishment of outlets therefrom, access elements of one or more of the types available are commonly mounted on the upper wall of the one-piece conduit, at closely spaced intervals, before the duct is embedded in a surrounding body of concrete. If as a factory-prepared article of commerce a length of conduit for installation as underfloor duct be provided with all the access elements for which there may conceivably be use after the duct is installed, the manufacture of the duct is rendered expensive. This is for the reason that as installed in different buildings, and in different localities within the same building, potential outlet connection to the underfloor wiring system will be found desirable at points which are ascertained when arrangement for the installation of the duct system is made. Even though in installation it be found that these points are widely separated, the duct lengths are in manufacture usually provided with access elements at closely spaced intervals, because the points of potential outlet are determined as an incident to installation of the duct, and close spacing is therefore had in order that outlet may be had at any point along a duct length where it may be desired.

It is desirable, then, that access elements should be applied to the lengths of underfloor conduit not at the factory in which the duct is manufactured, but as an incident to the installation of the duct. In providing for such application of access elements, however, it should be borne in mind that the access elements must be positively and definitely engaged to a wall of the conduit, that it be possible selectively to position the access elements in positive and definite engagement with the conduit, and that the access elements be of themselves of a sort to facilitate access from the surface of the floor in which the duct is embedded to the interior of the conduit for making outlet connection to the conductors therein. The general idea of selectively applying access elements to the conduit wall as an incident to the installation of underfloor duct is disclosed in the application for Letters Patent of one James M. G. Fullman, Serial No. 53,762, filed December 10, 1935.

Having as a general object of my invention the improvement of an underfloor duct assembly, such as that disclosed in the application for Letters Patent above noted, I have provided an assembly of conduit lengths forming the primary element of underfloor duct, and access elements arranged for positive selective mounting thereon, in which the selectively mounted access elements may be located, after the duct is installed and embedded, by means which lie wholly beneath the surface of a floor in which the duct assembly lies. Also, I provide access elements so contoured that they may be withdrawn from a concrete floor to leave unoccupied a space which had been reserved by them, within the floor material, for the potential making of outlet connection, and provide a parting surface whereby the bodies of the access elements may readily be separated in withdrawal from the concrete body of the floor which surrounds them. I also provide in the upper wall of the conduit, and in association with the means by which the access elements are mounted to the conduit, means facilitating the removal of a section of the upper conduit wall to obtain access to the interior of the conduit, such means serving also definitely to predetermine the area of the section so removed.

In obtaining the above noted advantages, I have avoided preforming, in the upper wall of the conduit, any opening of such sort as to permit the entrance of cement or trash into the interior of the conduit; and thus have avoided installing otherwise needless access elements or plugs for the mere purpose of closing a preformed opening in the conduit wall. As an advantage incident to exact determination of the area of the conduit wall which is removed in obtaining access to the interior of the conduit, fittings of standard size may be invariably used when access through the embedding floor and through the conduit wall has been had.

In the accompanying drawings

Fig. I is a plan view of a fragmentary length of one-piece metallic conduit, on a scale smaller than that of the figures of the drawings which follow, showing on the upper wall of the conduit length a plurality of closely spaced means for the selective attachment of access elements to the conduit, and showing two access elements mounted in selected position thereon.

Fig. II is a fragmentary longitudinal sectional view showing one access element mounted on the upper wall of the conduit, and showing the cover member of the access element in process of application thereto.

Fig. III is a fragmentary plan view showing the body of an access element in mounted position on the upper wall of the conduit, the closure member of the access element being removed to expose to view the means by which the body of the access element is attached to the conduit.

Fig. IV is a fragmentary longitudinal sectional view through the conduit and an access element mounted thereon, showing the access element completely assembled, and showing the floor material surrounding and overlying the conduit and the access element.

Fig. V is a fragmentary longitudinal sectional view through the conduit and floor body after removal of the access element to leave the opening leading to the upper wall of the conduit which has been reserved by the access element in the floor material, and illustrating the operation of drilling through the upper conduit wall to obtain access to the interior of the conduit.

Fig. VI is a fragmentary longitudinal view, showing a fitting mounted in the drilled opening in the upper wall of the conduit and an electrical standpipe mounted in the fitting.

In the accompanying drawings reference numeral 1 designates a one-piece metallic conduit length of substantially rectangular section, which conduit, as shown, has an upper wall 2 lying parallel to the surface 3 of an embedding floor structure 4 of concrete or the like. Along the conduit length screws having sharply formed kerfed heads 5 are mounted in threaded openings in the upper wall 2 of the conduit. The screw heads 5 are desirably formed, as shown, to provide a well defined underlying shoulder 6.

As shown, the screw heads 5 are closely spaced longitudinally of the upper conduit wall, in order that they may selectively provide convenient spacing or grouping of the access elements. As shown, the access elements are in the form of metallic cups 7, having metallic side walls 13 and relatively light and resilient metallic bottom walls 8. The lower wall 8 of each of the cups 7 is concave. That is, as the cup is placed on a conduit the lower wall 8 of the cup is bowed away from the conduit wall surface. In upwardly bowed wall 8 of the cup there is a keyhole slot 9, which has one terminal adjacent the center of the wall 8, and which has adjacent the periphery of the wall a region 10 of a size and shape adapting it to be passed over the screw heads 5.

As an incident to installation of the underfloor duct, the points at which it becomes apparent that potential access to the conduit should be reserved are noted, and at these points access elements are applied, leaving the other screw heads of the conduit unoccupied.

In applying each access element thus selectively and individually to the conduit, the more extended slot region 10 in the bottom of its cup 7 is aligned with a screw head, and the cup 7 of the access element is brought against the conduit wall with the screw head projected through the opening 10 into the interior of the cup. By horizontal shifting movement of the cup 7, the more restricted region 9 of the keyhole slot in the bottom wall of the cup is brought under the screw head 5 for attachment of the access element cup to the conduit.

Because of the upwardly bowed form of bottom wall 8, the resilient edges of the wall material along the portion 9 of the slot bear resiliently upward against the shoulder 6 beneath the screw head 5. The cooperative forms of the bottom wall 8 of the access element and of the screw head 5 thus provide a resilient snap engagement of the access element on the conduit, so that the engagement of the access element not only holds it firmly against vertical displacement, but also tends to resist lateral shifting movement of the access element along the slot in its bottom wall. This effect is enhanced by small upward deflections 10a at the edges of the more restricted portion of the keyhole slot. These are forced downwardly as the slot passes along the screw head, and snap behind the screw head in located position of the cup.

The cup 7 of the access element is closed upwardly by suitable means, such as the pan-form closure 11 shown in the drawings. Desirably, this pan-form closure is also of light resilient metal, and is provided with a peripheral lip 12 adapted to overlie the peripheral wall 13 of the cup in which it is set. By appropriate dimensioning of the cup proper, and the pan-form closure for it, the closure thus has a resilient engagement in the cup.

In association with the closure member 11 of the access element, I provide means for facilitating location of the access element, which means may be embedded in concrete lying within the cavity of the closure member, and lying wholly below the upper surface of the floor. This locating means is a permanent bar magnet 14 mounted in a central opening 15 in the closure member, and may lie wholly beneath the floor surfacing, which surfacing may consist of a linoleum, as shown, or may consist of wood, tile, a skin of smooth fine concrete, or other suitable surfacing material. Because of its disposition and nature the magnet provides means for locating the mounted access elements of the underfloor duct installation, without appearing at the surface of the floor to interrupt the continuity of the floor surface, and without providing means upwardly extended to the floor surface which might be struck to cause an undesired cracking of the relatively thin layer of concrete overlying the access element.

Assuming that the underfloor duct has been installed, and embedded in the floor material, with access elements positioned at appropriate points therealong, the operation of obtaining access to the interior of the conduit, and the mounting of fittings therein, is facilitated by the means provided for that purpose. First, the exact position of an appropriately placed access element is determined by use of a compass needle, or other instrument sensitive to the influence of the magnets of the access elements. An access element having been located, the floor surfacing is cut or chipped away in a region immediately overlying it, and the skin of concrete contained in the pan-shaped cover member 11 is then cracked. This last operation is easily performed, because of the yielding support which the cover member 11 provides for the concrete contained in it. Cover member 11 having been removed, the cup 7 also may easily be removed from its position in the opening which it has functioned to maintain in the body of the floor material. To remove the cup 7 the screw engaging it to the conduit is removed. In order to facilitate removal of the cups 7, I provide the cups in installation, with a peripheral casing of heavy paper, paperboard, or the like, 16, which desirably carries a lubricant, preferably paraffine, to facilitate removal of the cup from it.

The access element having been removed, and loose chips of concrete having been taken out of the opening 17 through the body of the floor thus made, the upper wall 2 of the conduit lies exposed. In order to obtain access into the interior of the conduit, the upper conduit wall being continuous, a suitable circular section of the wall at the base of the opening 17 may be removed by a suitable drill, such as the fitting drill 18 which is shown. In drilling, the screw, which has served as an engaging member for the access element, is removed, its removal leaving a small opening into which a centering bit or stem of the drill 18 may be inserted. The annular toothed skirt of the drill lies, and cuts, in a preformed groove 19, which is concentric with the small opening 20 initially occupied by the screw which engaged the access element.

Each concentric groove 19, as it is preformed in the upper conduit wall 2, extends partway only through the wall thickness, and therefore leaves the upper wall of the conduit continuous as the conduit is prepared for installation. The provision of the grooves 19 does not therefore necessitate the use of plugs, or of functionless access elements to close openings through the upper wall of the conduit. Functionally the preformed grooves 19 accurately position the drill, which must be from above the floor level, and also decrease the thickness of the metal which must be cut in drilling through the conduit wall. Incidentally, they definitely define the area of the piece which is removed from the upper wall of the conduit in making access at any one of the regions provided for that purpose, thus standardizing the fittings which are applied in the openings through the upper conduit wall provided in selectively making access to the interior of the conduit, since the drill cannot shift in its operation, being centered not only by the center bit, or stem, but also by the channel provided for its cutting ring.

Desirably, I mount in the drilled opening through the upper wall of the conduit a fitting which is of simple structure and which may readily be mounted in the opening in spite of the difficulties presented by the restricted passage through the wall material. The fitting shown in the drawings is the fitting disclosed in the application of Frank J. Kennedy, Serial No. 58,341, filed January 9, 1936. This fitting comprises a collar 21 and a laterally extended flange 22 formed on both a major and a minor axis. Indentations 23 within the collar permit the collar pivotally to be supported on centers forming part of a tool in the form of expansible tongs. It may thus be introduced through the opening in the upper conduit wall by presentation of its minor axis thereto, and swung into position, with the major axis of its flange lying against the under surface of the conduit wall adjacent the opening by being rotated into such position. In mounted position the flanged collar member is held by a sleeve 24 which rests upon the upper surface of the conduit wall in the manner shown. As shown, collar 21 is threaded interiorly, as well as exteriorly, and engages in mounted position an electrical standpipe 25 through which connection to the housed conductors of the conduit is made.

There is a secondary and cooperative function attributable to the preformed grooves 19 in the upper wall of the conduit, and the bar magnets 14 carried by the access elements. In rare instances it may happen to be desirable that an unexpected outlet connection be made to the conductors housed in the underfloor conduit. In such event the operator first locates the access element nearest the point at which the unexpected outlet is to be made by means of the perceptible effect of the magnet carried by that access element, and may if necessary similarly determine the position in which the duct extends. The spacing between the screw heads 5 being standardized, the operator can measure in line to a screw head in the region in which access is desired. Then by breaking through the floor material to expose the screw head and its concentric associated groove, he may, after removing the screw, drill through the conduit wall in the manner above described. Such operation, of course, involves greater difficulty in breaking through the floor than is encountered in exposing the upper surface of the conduit at a point where the space for such exposure has been reserved by means of an access element. It also frequently results in the formation of a jagged and unsightly hole through the floor material which requires smoothing and dimensioning. It does, however, provide accommodation to those rare instances in which access is unexpectedly desired at an unequipped point along the duct.

It is to be understood that access elements of different form may be used to replace the cup element which has been described. Several forms of such access element are shown in the patent to Otto A. Frederickson, No. 1,776,656, dated September 23, 1930. An access element as herein shown is the one most satisfactory in association with the other several features of my invention. One advantage of primary importance which it possesses is that it may be engaged to the screw heads at the upper wall of the conduit without removing the screws of which they form part. This is of great importance both in facilitating assembly during installation of the duct, and in assuring that no openings may remain in the conduit when it is embedded in the floor. It being unnecessary to remove the engaging screws for engagement of access element thereto, the screws are desirably fixed in position against removal, save by the exercise of considerable force, in some simple manner, as by a terminal deformation at the end of a screw thread.

It should be understood that headed engaging members which are welded or soldered to the one-piece conduit of the duct assembly may be used instead of the screws which are shown. If the headed engaging members are secured to the conduit in such manner, they must be cut or knocked off after the access element has been removed, and in preparation for drilling by means of a ring drill of proper diameter provided with a central bit. In such case the concentric grooves 19 are of increased importance in locating the circular line at which a piece is cut out of the conduit wall.

The upwardly bowed bottom wall of the access element cup, containing a key hole slot for engagement with the screw head, provides means of great simplicity for effecting snap engagement between the access element and the screw or other headed member by which it is mounted in fixed position on the conduit wall. The access elements are also so shaped that they are readily removed to expose the preformed grooves in which the cutting ring of the appropriate ring drill may run.

Generally considered, the practice of my invention decreases the expenditure of time in establishing outlet connection to the underfloor conduit which houses the electrical conductors, and to such extent the invention renders the use of underfloor duct more convenient and wholly satisfactory.

I claim as my invention:

In an underfloor duct assembly for electrical conductors the combination of a closed metallic conduit length having on the upper wall thereof a plurality of longitudinally spaced engaging members mounted in the conduit wall, and preformed circular grooves concentric with the several engaging members and extended partway through the upper conduit wall each to provide a defined line of cutting concentric with the point of mounting of an engaging member, said grooves being adapted to receive and guide a circular cutting tool in removing circular sections of the upper conduit wall defined by the grooves, together with access elements adapted individually to engage the engaging members and the upper wall of the conduit in position each to overlie one of the said circular grooves and to reserve in cementitious material embedding the conduit spaces leading to the said circular grooves in the upper wall of the conduit.

WILLIAM C. ROBINSON.